United States Patent
Readshaw et al.

(10) Patent No.: US 10,432,666 B2
(45) Date of Patent: Oct. 1, 2019

(54) METHOD AND APPARATUS FOR ASSOCIATING DATA LOSS PROTECTION (DLP) POLICIES WITH ENDPOINTS

(71) Applicants: Neil Ian Readshaw, Parkwood (AU); Jayashree Ramanathan, Round Rock, TX (US); Gavin George Bray, Robina (AU)

(72) Inventors: Neil Ian Readshaw, Parkwood (AU); Jayashree Ramanathan, Round Rock, TX (US); Gavin George Bray, Robina (AU)

(73) Assignee: Sailpoint Technology Holdings, Inc., Austin, TX (US)

( * ) Notice: Subject to any disclaimer, the term of this patent is extended or adjusted under 35 U.S.C. 154(b) by 333 days.

(21) Appl. No.: 15/094,405

(22) Filed: Apr. 8, 2016

(65) Prior Publication Data
US 2016/0226918 A1 Aug. 4, 2016

Related U.S. Application Data

(63) Continuation of application No. 12/963,967, filed on Dec. 9, 2010, now Pat. No. 9,311,495.

(51) Int. Cl.
*H04L 29/06* (2006.01)
*G06F 21/55* (2013.01)
*G06F 21/60* (2013.01)
*G06F 21/62* (2013.01)

(52) U.S. Cl.
CPC ............. *H04L 63/20* (2013.01); *G06F 21/55* (2013.01); *G06F 21/604* (2013.01); *G06F 21/6218* (2013.01); *H04L 63/104* (2013.01)

(58) Field of Classification Search
CPC ...................................................... H04L 63/20
See application file for complete search history.

(56) References Cited

U.S. PATENT DOCUMENTS

| | | | | |
|---|---|---|---|---|
| 5,892,909 A * | 4/1999 | Grasso | ............ | G06F 17/30867 707/E17.109 |
| 6,157,401 A * | 12/2000 | Wiryaman | .......... | H04L 12/1822 348/14.08 |
| 7,559,080 B2 * | 7/2009 | Bhargavan | ............. | H04L 63/08 713/151 |
| 8,239,915 B1 * | 8/2012 | Satish | .................... | G06F 21/00 713/166 |

(Continued)

FOREIGN PATENT DOCUMENTS

WO WO2010023477 3/2006

OTHER PUBLICATIONS

Wikipedia, "endpoint", 2017.*

(Continued)

*Primary Examiner* — Ondrej C Vostal
(74) *Attorney, Agent, or Firm* — Sprinkle IP Law Group

(57) ABSTRACT

A method of policy management in a Data Loss Prevention (DLP) system uses a policy model that associates a user with one or more DLP endpoints. When an endpoint is added to the system, a set of policies for that endpoint are determined using an identity of the user that is associated with the endpoint and a list of roles or groups for that user. At policy distribution time, the method determines a set of endpoints to which the policy is to be distributed.

6 Claims, 3 Drawing Sheets

(56) References Cited

U.S. PATENT DOCUMENTS

| | | | |
|---|---|---|---|
| 2002/0178249 A1* | 11/2002 | Prabakaran | G06F 11/1451 709/223 |
| 2003/0023623 A1* | 1/2003 | Horvitz | G06F 21/335 715/201 |
| 2003/0126235 A1* | 7/2003 | Chandrasekar | G06F 17/30864 709/220 |
| 2003/0126464 A1* | 7/2003 | McDaniel | G06F 21/604 726/4 |
| 2004/0010586 A1* | 1/2004 | Burton | H04L 41/0681 709/224 |
| 2006/0179040 A1 | 8/2006 | Bird et al. | |
| 2007/0050455 A1* | 3/2007 | Yach | G06Q 10/109 709/206 |
| 2007/0061458 A1* | 3/2007 | Lum | H04L 61/2015 709/225 |
| 2007/0143827 A1* | 6/2007 | Nicodemus | G06F 21/6218 726/2 |
| 2007/0150934 A1 | 6/2007 | Fiszman et al. | |
| 2007/0153814 A1* | 7/2007 | Canning | H04L 63/10 370/401 |
| 2007/0266421 A1 | 11/2007 | Vaidya et al. | |
| 2008/0184336 A1 | 7/2008 | Sarukkai et al. | |
| 2009/0248693 A1* | 10/2009 | Sagar | G06F 16/00 |
| 2010/0162347 A1 | 6/2010 | Barile | |
| 2010/0174833 A1* | 7/2010 | Filer | G06F 17/30386 710/8 |
| 2011/0053618 A1* | 3/2011 | Lin | H04L 51/12 455/466 |
| 2011/0093768 A1* | 4/2011 | Panwar | G06F 21/6245 714/809 |
| 2011/0264781 A1* | 10/2011 | Moser | H04L 61/1523 709/223 |
| 2012/0023546 A1* | 1/2012 | Kartha | H04L 63/104 726/1 |

OTHER PUBLICATIONS

Mogull, "Five endpoint DLP deployment data security tips," http://searchsecurity.techtarget.com/tip/0,289483,sid14_gci1381198,00.html, Mar. 9, 2010.

Hunter, "Data Loss Prevention Best Practices," Sep. 2007.

Ansanelli, "Data Loss Prevention: Where Do We Go From Here?" http://www.infosectoday.com/Articles/DataLossPrevention.htm, Mar. 24, 2008.

Nosseir, "You sent what?—Linking identity and data loss prevention to avoid damage to brand, reputation & competitiveness," Apr. 29, 2010.

Christiansen, "Identity and Access Management for Approaching Clouds," May 2010.

\* cited by examiner

METHOD AND APPARATUS FOR ASSOCIATING DATA LOSS PROTECTION (DLP) POLICIES WITH ENDPOINTS

RELATED APPLICATIONS

This application is a continuation of, and claims a benefit of priority under 35 U.S.C. 120 from, U.S. patent application Ser. No. 12/963,967 filed Dec. 9, 2010, entitled "METHOD AND APPARATUS FOR ASSOCIATING DATA LOSS PROTECTION (DLP) POLICIES WITH ENDPOINTS," issued as U.S. Pat. No. 9,311,495, which is hereby fully incorporated herein by reference for all purposes.

BACKGROUND OF THE INVENTION

Technical Field

This disclosure relates generally to identifying and managing user operations with respect to sensitive information (e.g., intellectual property, personally identifiable information, and the like).

Background of the Related Art

Data Loss Prevention (DLP) systems are well-known in the prior art and operate generally to identify, monitor use of, and to control user operations on, sensitive information within an enterprise computing environment. Typically, DLP systems provide a policy-based mechanism for managing how data is discovered and classified on a user's workstation or file server, also known as an "endpoint." Policies must be distributed to, and enforced on, each endpoint. Existing DLP solutions typically use of a few approaches to how these policies are distributed to endpoints.

In one approach, all policies are distributed to all systems. This approach does not scale for enterprise deployments where the DLP system will be used to meet requirements for different types of sensitive content, with different types of acceptable use for subsets of the user population. As an example, it is perhaps expected to find design documents and source code on an endpoint owned by a software developer but not on an endpoint owned by someone in the Human Resources department.

In another approach, policies are selectively distributed based on characteristics of the endpoint system. Those characteristics might include MAC address, IP address, DNS domain, geographic location, or the like. This approach is not always suitable with a mobile workforce or when users with the same role in an organization are geographically dispersed. Moreover, government and corporate regulations that drive the acquisition of DLP solutions require being able to relate sensitive data access to an individual.

In yet another approach, policies are selectively distributed based on the type of policy enforcement point. Policy management systems often provide a way to distribute different policies to different types of policy decision points or policy enforcement points. For example, the IBM® Tivoli® Security Policy Manager provides a mechanism whereby non-DLP policies can be distributed to network devices (such as IBM WebSphere® DataPower® appliances) as well as content management systems (such as Microsoft SharePoint) and application servers (such as IBM WebSphere Application Server). This model is well-suited to server-based enforcement systems but is of more limited use in the endpoint case.

While these approaches are valid and useful and can produce workable systems, they have limitations that impact on the utility of a DLP solution.

It is desired to provide enhanced techniques for associating data loss protection policies with endpoints that addresses the above-described deficiencies.

BRIEF SUMMARY OF THE INVENTION

A policy-based mechanism for a Data Loss Prevention (DLP) system includes an identity-centric method for associating data loss protection policies with endpoints on which those policies need to be used. In general, a set of policies applicable to an endpoint is determined based on a combination of identity and endpoint characteristics.

In one embodiment, a method of policy management in a DLP system begins by defining a policy model that associates a user with one or more endpoints, and wherein the user is associated with at least one role or group. According to the method, when an endpoint is added to the system, a set of policies for that endpoint are determined using an identity of the user that is associated with the endpoint and a list of roles or groups for that user. In particular, the set of policies for the endpoint are determined by identifying the user owning or responsible for the endpoint, retrieving a list of roles or groups for that user, and then defining the set of policies (for that endpoint) as the policies that reference each role or group to which the user is associated. At policy distribution time, the method determines a set of endpoints to which the policy is to be distributed. In particular, the set of endpoints to which the policy is to be distributed begins by generates an endpoint set. The endpoint set is then populated as follows. For each role or group that is a target of the policy, the method identifies each user associated with the role or group. Then, for each user associated with the role or group, the method identifies a list of one or more endpoints with which the user is associated. The one or more endpoints from the list are then added into the endpoint set. After the endpoint list for the policy is calculated, the policy and its associated endpoint list are added to a policy distribution list, which identifies one or more policies that are then distributed to the endpoints using conventional means.

In an alternative embodiment, the above-described method is performed in a DLP policy management apparatus. The apparatus comprises a processor, and computer memory that holds computer program instructions executed by the processor to carry out the method.

In another alternative embodiment, the above-described method is performed by a computer program product in a computer readable medium for use in a DLP system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
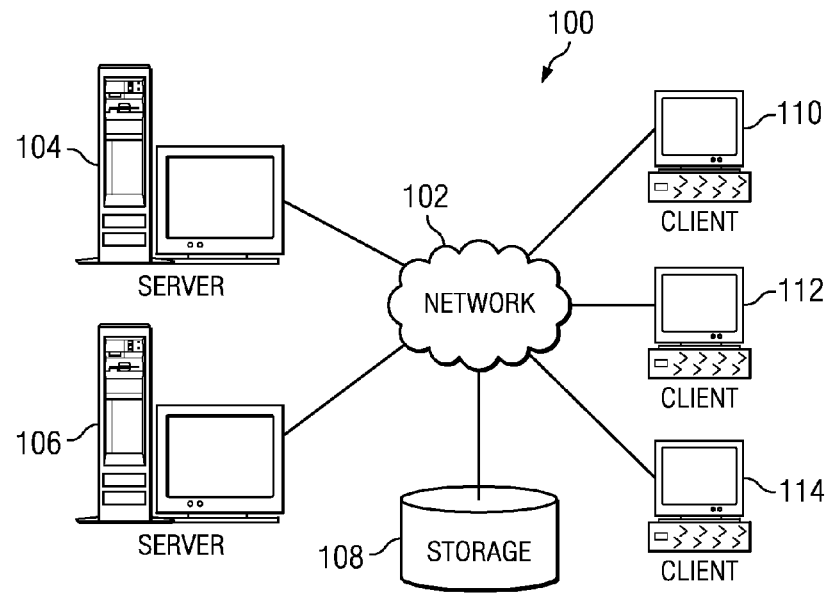
FIG. 1 depicts an exemplary block diagram of a distributed data processing environment in which exemplary aspects of the illustrative embodiments may be implemented.
Figure 2:
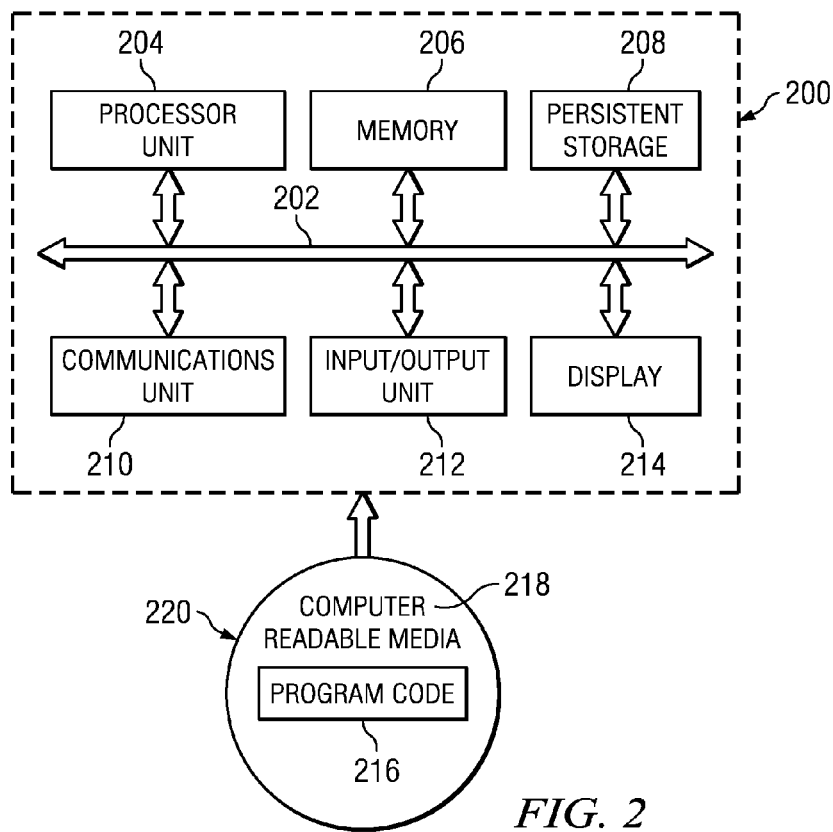
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
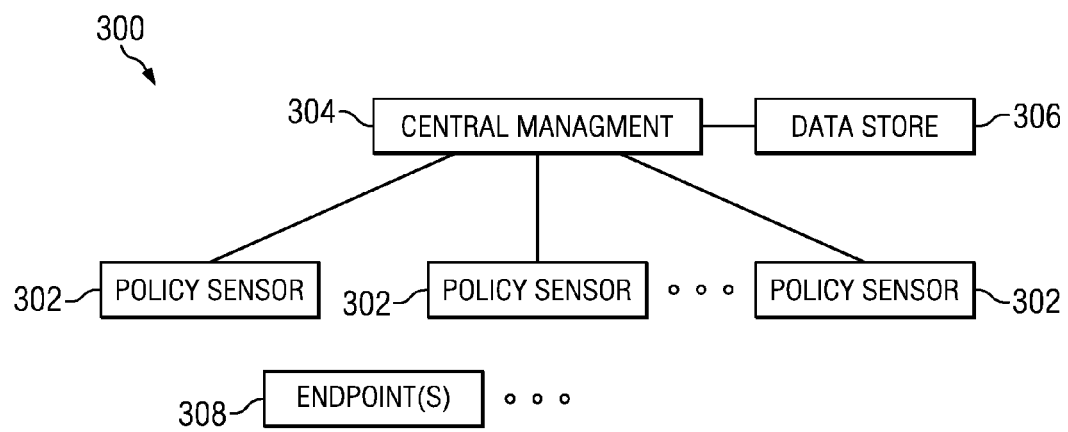
FIG. 3 illustrates a data loss prevention (DLP) solution in which the subject matter of this disclosure may be implemented.

Although not meant to be limiting, a representative data processing system in which the techniques of this disclosure are implemented is an appliance-based data loss prevention (DLP) solution. DLP systems are well-known and work to reduce the risk of sensitive data loss, primarily at the network layer. As seen in FIG. 3, a representative DLP solution 300 comprises a set of distributed components, typically arranged in a tiered architecture. Multiple policy sensors 302 are placed around the network (typically as rack-based appliances, software applications, or the like) and are designed to detect and/or prevent data loss. Generally, in an appliance-based implementation, an appliance may comprise a data processing system such as described in FIG. 2. The appliance includes a policy engine that works generally by capturing packets from the network, reassembling the packets into sessions, analyzing the information flow, extracting content for analysis, and performing content analysis to identify sensitive information. The appliance may use system-defined or user-defined policies, where a policy represents a group of one or more rules. A rule typically is a logical combination of one or more triggers that are content-based, location-based and/or flow-based. Sessions with policy violations are detected by the sensors and forwarded a central management console 304 that distributes policies and collects and organizes alerts. A data store 306 is used to store data and policies, typically in a database. The central management console 304 includes a web-based graphical user interface (GUI) for management, administration and reporting. As used herein, the type of sensitive information protected by such a DLP solution may be quite varied. Typically, such information includes, without limitation, intellectual property (e.g., code, designs, documentation, other proprietary information), identity information (e.g., personally identifiable information (PII)), credit card information (such as PCI-related data), health care information (such as HIPAA-related data), finance information (such as GLBA-related data), and the like. As also seen in FIG. 3, the DLP solution is implemented across one or more endpoints 308.

Preferably, a policy is created and managed in the central management console (such as shown in FIG. 3).

DLP functionality may also be built into other enterprise systems, such as an intrusion detection system (IDS), an intrusion protection system (IPS), network firewalls, web gateways, mail servers or relays, enterprise content management systems, or the like. Thus, for example, an IPS can monitor and detect attack traffic, and DLP support can be added to perform outbound DLP protection and associated blocking of the transfer of sensitive content.

Thus, in general a DLP system in which the subject matter herein is implemented provides a policy-based mechanism for managing how data is discovered and classified on an endpoint workstation, file server or other device within an enterprise. As used herein, in general an endpoint is a data processing system (such as described above in FIG. 2) and that has an associated file system (or equivalent data store). The endpoint may execute DLP software. As noted, a representative endpoint is a data processing system that includes a DLP application that executes as software, i.e., as a set of program instructions, executed from computer memory by a processor. The DLP application is configurable according to a policy, where the policy is created and managed in a central management console (such as shown in FIG. 3). This is not a limitation, however, as a particular DLP policy may be implemented locally (at the endpoint itself).

According to this disclosure, an identity-centric method is used to associate a data loss protection policy with an endpoint in a DLP system. The preferred technique implements a policy model that associates a pair of entities— namely, a "user," on the one hand, and an "endpoint" on the other hand—to enable identity to determine where to apply a DLP policy. By including the user relationship in the policy model, the described approach enables the policy set that is distributed to and used on an endpoint to be changed when the responsible user changes or that user's role changes. In addition, the explicit linkage of a policy to a user allows for auditing and compliance to be linked to an individual, i.e., the actual user that accesses, possesses or misuses the sensitive information.

Thus, according to the technique which is now described, a DLP system implements a policy model that uses an identity-endpoint relationship for the purpose of policy distribution.

Figure 4:
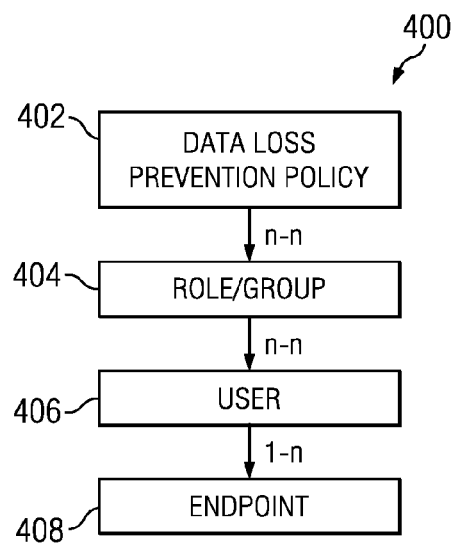
FIG. 4 illustrates a policy model according to this disclosure.

A policy model that underlies the subject matter herein is illustrated in FIG. 4. Preferably, the policy model 400 comprises a set of entities, namely, a DLP Policy entity 402, a Role/Group entity 404, a User entity 406, and an Endpoint entity 408. As noted above, the policy model provides a significant advantage in that is associates a User and an Endpoint. This "identity-centric" approach to associating a data loss protection policy with an endpoint provides significant advantages over the prior art. How an enterprise user of the DLP system (in which the described policy model is implemented) decides to make this association is discretionary, although the following are several typical used cases that might be implemented. In the case of a single user laptop, desktop or workstation, the user associated with the endpoint may be the user who owns the endpoint, or the user whom the organization considers to be responsible for the content on the system. In the case of a shared system, such as a network file server, the user associated with the endpoint may be the administrator of the IT system. Alternatively, the user could be a responsible person in the line of business that uses the system. For example, the user associated with a network file server for the Marketing Department might be the Vice President of Marketing. Of course, these are just representative examples, as a particular enterprise that implements the policy model (through the techniques and systems disclosed herein) may determine to define the user-to-endpoint association in its discretion.

According to this disclosure, a first algorithm is used to determine a complete set of policies for a single endpoint. This complete set is referred to as a "Policy Set." This algorithm takes the user who owns or is responsible for the endpoint and identifies a list of roles/groups for that user. The Policy Set then identifies a set of policies that reference that role/group. Thus, the first algorithm is used to determine all of the policies that are applicable to a given endpoint. This algorithm may be used when an endpoint registers and requests policy.

When a new policy is created, or when an existing policy is modified, a second algorithm is used to determine which endpoints need to use that policy. Thus, the second algorithm is used to determine the set of endpoints to which the policy should be distributed. This algorithm, in effect, walks the diagram in FIG. 4 in the reverse direction. For a particular policy to be distributed, this algorithm generates a list of endpoints that should receive the policy. In particular, for each role/group within a target of the policy, the routine identifies each user who is member of the role/group, obtains the list of endpoints for which that user is responsible, and adds those endpoints to the list of endpoints. The policy is then distributed to that set of endpoints using any convenient distribution mechanism. Although not meant to limit this disclosure, the algorithms may be implemented in software as a set of computer program instructions executed by a processor within or in association with the central management console of FIG. 3. In the alternative, a dedicated machine, system, program, process, utility or the like, may be used for this purpose. Preferably, the identity-centric approach is implemented within the central management console, e.g., using data stored in the data store, and the resulting policy is distributed from the central management console to the endpoints, where it is enforced according to known DLP techniques.

Figure 5:
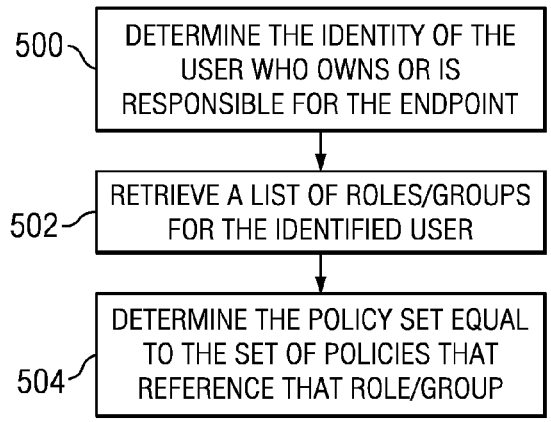
FIG. 5 illustrates a process flow describing a first algorithm for use in calculating applicable policies for an endpoint according to this disclosure.

FIG. 5 illustrates the first algorithm that is used to determine a set of policies for a single endpoint using a policy model that includes a User associated with an Endpoint according to this disclosure. In one embodiment, and as noted above, the algorithm is executed when a new endpoint is registered with the DLP system and the endpoint needs to obtain its complete set of policies. The input to the algorithm is an Endpoint identifier, and the output is a Policy Set. The algorithm begins at step 500 by performing a lookup on the user who owns or is responsible for the endpoint. At step 502, the routine retrieves a list of roles/groups for that user. At step 504, the routine determines the Policy Set to be equal to the set of policies which reference that role/group.

Figure 6:
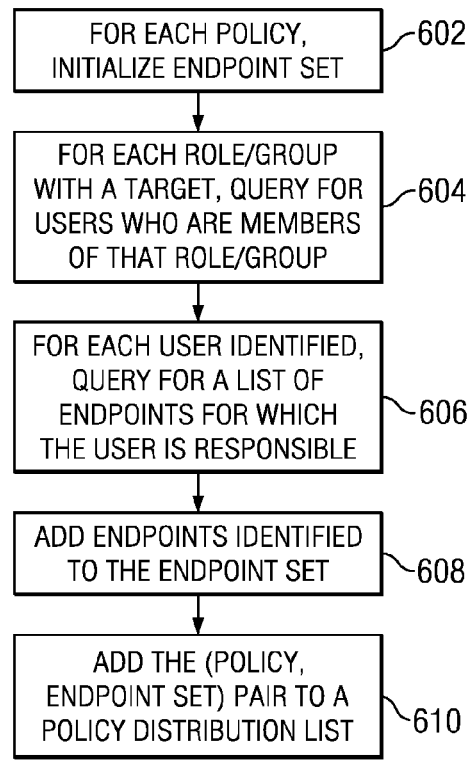
FIG. 6 illustrates a process flow describing a second algorithm for calculating endpoints to which to distribute a policy according to this disclosure.

FIG. 6 illustrates the second algorithm referenced above and that is used to determine the set of endpoints to which a single policy should be distributed. As also noted above, typically this algorithm is executed when a policy is created or modified and needs to be distributed to all endpoints that it affects. The input to this algorithm is a Policy Set (which includes role/group representation of the target of the policy), and the output is a Policy Distribution List that is equal to Map (<policy>, <endpoint list>). For each Policy, the routine initializes a data set, which is referred to as the Endpoint Set. This is step 602. At step 604, and for each role/group within the target of the Policy, the routine queries for users who are members of the role/group. At step 606, and for each user identified in step 604, the routine then queries for a list of endpoints for which the user is responsible. At step 608, the endpoints identified in step 606 are added to the Endpoint Set. After all users who are members of the role/group have been evaluated, the routine performs an Add function that adds the (Policy, Endpoint Set) pair to a Policy Distribution List. This is step 610, and it generates the Map. This completes the algorithm.

The Policy Distribution List thus includes the endpoint set associated with one or more policies to be distributed to the endpoints. Each policy in the Policy Distribution List is then distributed to the endpoints in its associated endpoint set. The mechanism for distributing the policies to the endpoints may comprise known network protocols and delivery techniques. Such techniques may include, without limitation, WS-Notification, WS-Metadata Exchange protocols, a SOAP-based web service, a RESTful web service, and the like. The policy distribution mechanism is not part of this disclosure.

The DLP Policy entity 402 may be a single entity, or it may be a combination of other existing entities in a policy management system. The particular composition of a DLP Policy entity 402 is not a limitation, and is not an aspect of this disclosure. The Role/Group entity 404 is similar to the construct used in security policy management systems wherein the Role or Group construct may have varying definitions. Thus, in one known approach, the Role entity is abstract, while the Group entity is native to the Information Technology (IT) system, such as an LDAP directory. In these systems, some mapping from Role to Group or User typically is required. In other known policy management systems, terms such as Role and Group are both native in the IT system; in yet other systems, the terms Role and Group are used interchangeably. More advanced role management systems may also enable hierarchical roles (e.g., a 'surgeon' role defined within a 'clinician' role), as well as Boolean relationships between or among roles (e.g., 'everyone except software developers', or 'manager with the sales department', and so forth). The policy model in this disclosure is applicable to all of these types of systems. In particular, the policy model may be implemented using a Role/Group entity that applies to any such approaches or conventions. For convenience, the different types of role/group entity conventions may be referred to herein as a single "management entity." Moreover, the association from Role/Group to User through whatever means is not considered an aspect of this disclosure, as any of the above-described approaches may be used.

The subject matter described herein has many advantages. The approach reduces network bandwidth requirements for distributing policies to a diverse set of endpoints. It provides improved efficiency of policy use on endpoints because only relevant policies will be present on a given endpoint. Moreover, the identity-centric nature of the DLP policy facilitates identity-centric auditing, reporting and compliance, which is often an important business driver for deploying a DLP solution.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the DLP policy association functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the algorithms described above are implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing DLP solution.

The DLP central management console exposes one or more web-based interfaces that may be used to create and/or modify a policy, and/or to determine policies applicable to a particular endpoint.

The described functionality may be implemented as an adjunct or extension to an existing DLP solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The techniques disclosed herein are not limited to a middleware DLP appliance that monitors network traffic such as has been described, but this will be a typical implementation. As noted, the above-described identity-centric policy association function may be used in any system, device, portal, site, or the like wherein it is desired to analyze data for inclusion of sensitive information.

Having described our invention, what we now claim is as follows:

1. A method of policy management in a data loss prevention (DLP) system, comprising:
   defining a policy model that associates a user with one or more endpoints, the user being associated with at least one role or group;
   determining a set of policies for an endpoint in the DLP system using an identity of the user that is associated with the endpoint and a list of roles or groups for the user; and
   determining a set of endpoints for distribution of a policy by generating an endpoint set, the endpoint set for the policy generated by the following sub-steps:
      for each role or group that is a target of the policy, identifying each user associated with the role or group;
      for each user associated with the role or group, identifying a list of one or more endpoints with which the user is associated; and
      adding the one or more endpoints from the list into the endpoint set, wherein at least one of the determining steps is performed using a computer program executing in a hardware element;
   generating a policy distribution list that includes the endpoint set associated with one or more policies for distribution to the endpoints; and
   distributing each policy included in the distribution list to the endpoints identified in its associated endpoint set.

2. The method as described in claim 1, wherein the set of policies for the endpoint reference each role or group to which the user is associated.

3. An apparatus for policy management in a data loss prevention (DLP) system, comprising:
   a processor;
   computer memory holding computer program instructions that when executed by the processor perform a set of operations comprising:
      defining a policy model that associates a user with one or more endpoints, the user being associated with at least one role or group;
      determining a set of policies for an endpoint in the DLP system using an identity of the user that is associated with the endpoint and a list of roles or groups for the user; and
      determining a set of endpoints for distribution of a policy by generating an endpoint set, the endpoint set for the policy generated by the following sub-steps:
         for each role or group that is a target of the policy, identifying each user associated with the role or group;
         for each user associated with the role or group, identifying a list of one or more endpoints with which the user is associated; and
         adding the one or more endpoints from the list into the endpoint set;
      generating a policy distribution list that includes the endpoint set associated with one or more policies for distribution to the endpoints; and
      distributing each policy included in the distribution list to the endpoints identified in its associated endpoint set.

4. The apparatus as described in claim 3, wherein the set of policies for the endpoint reference each role or group to which the user is associated.

5. A computer program product in a non-transitory computer readable medium for policy management in a data loss prevention (DLP) system, the computer program product holding computer program instructions which, when executed by the data processing system, perform a set of operations comprising:
   defining a policy model that associates a user with one or more endpoints, the user being associated with at least one role or group;
   determining a set of policies for an endpoint in the DLP system using an identity of the user that is associated with the endpoint and a list of roles or groups for the user; and
   determining a set of endpoints for distribution of a policy by generating an endpoint set, the endpoint set for the policy generated by the following sub-steps:
      for each role or group that is a target of the policy, identifying each user associated with the role or group;
      for each user associated with the role or group, identifying a list of one or more endpoints with which the user is associated;
      adding the one or more endpoints from the list into the endpoint set; and generating a policy distribution list that includes the endpoint set associated with one or more policies for distribution to the endpoints; and distributing each policy included in the distribution list to the endpoints identified in its associated endpoint set.

6. The computer program product as described in claim 5, wherein the set of policies for the endpoint reference each role or group to which the user is associated.

* * * * *